US012771983B2

(12) United States Patent
Östlin et al.

(10) Patent No.: US 12,771,983 B2
(45) Date of Patent: Oct. 20, 2026

(54) EAR TIP CONNECTED TO EAR BUD BODY INNER PORTION CONFIGURED TO PROVIDE ACOUSTIC IMPEDANCE THROUGH TIP VENT

(71) Applicant: Nuheara IP Pty Ltd, Northbridge (AU)

(72) Inventors: Erik Östlin, Hamilton Hill (AU); Aaron Brodie, High Wycombe (AU); Alan Davis, Riverton (AU)

(73) Assignee: NUHEARA IP PTY LTD (AU)

( * ) Notice: Subject to any disclaimer, the term of this patent is extended or adjusted under 35 U.S.C. 154(b) by 407 days.

(21) Appl. No.: 18/492,342

(22) Filed: Oct. 23, 2023

(65) Prior Publication Data

US 2024/0147132 A1 May 2, 2024

(30) Foreign Application Priority Data

Oct. 29, 2022 (AU) ................................ 2022903217
Jan. 3, 2023 (AU) ................................ 2023900003

(51) Int. Cl.
*H04R 1/10* (2026.01)

(52) U.S. Cl.
CPC ........... *H04R 1/105* (2013.01); *H04R 1/1016* (2013.01); *H04R 1/1066* (2013.01); *H04R 1/1075* (2013.01)

(58) Field of Classification Search
CPC .... H04R 1/105; H04R 1/1016; H04R 1/1066; H04R 1/1075; H04R 2460/01; H04R 2460/11; H04R 1/1083; H04R 1/2823; H04R 1/1058; H04R 25/654; H04R 25/60; H04R 25/652; H04R 1/26; H04R 1/2842; H04R 2460/09; H04R 25/656;
(Continued)

(56) References Cited

U.S. PATENT DOCUMENTS 8,189,846 B2 5/2012 Tiscareno et al.
8,774,444 B2 7/2014 Tiscareno et al.
(Continued)

FOREIGN PATENT DOCUMENTS

WO WO-2019146590 A1 * 8/2019 ........... H04R 1/1091

OTHER PUBLICATIONS

International Search for Provisional Patent Application issued in Corresponding Australian Patent Application No. 2023900003, dated May 11, 2023.

*Primary Examiner* — Angelica M McKinney
(74) *Attorney, Agent, or Firm* — Andrus Intellectual Property Law, LLP

(57) ABSTRACT

An ear tip has an inner part connectable to an ear bud body of an earbud, and an outer part disposed at least partially over the inner part. The outer part is flexible and is for coupling the ear tip to a user's ear canal. The inner part includes an inwardly facing wall and an outwardly facing wall, the inner wall defining at least part of a primary sound communication path between the ear canal and the ear bud body. The inner part includes at least one tip vent that defines an ambient sound communication path between the inwardly facing wall and the outwardly facing wall, and thereby the user's ear canal and ambient. The inner part provides an acoustic impedance to sound passing through the at least one tip vent and thereby defined sound characteristics in the ambient audio communication path. An ear bud is also described.

20 Claims, 6 Drawing Sheets

(58) Field of Classification Search
CPC .............. H04R 2225/77; H04R 1/2857; H04R 1/1091; A61F 11/085; A61F 11/08
See application file for complete search history.

(56) References Cited

U.S. PATENT DOCUMENTS

| | | | | |
|---|---|---|---|---|
| 10,542,341 | B2 * | 1/2020 | Higgins | H04R 25/60 |
| 11,381,898 | B2 * | 7/2022 | Choi | H04R 9/06 |
| 2006/0133636 | A1 * | 6/2006 | Harvey | H04R 1/26<br>381/381 |
| 2009/0209304 | A1 * | 8/2009 | Ngia | H04R 1/1091<br>455/575.2 |
| 2013/0343564 | A1 * | 12/2013 | Darlington | H04R 1/1083<br>381/74 |
| 2015/0382100 | A1 | 12/2015 | Azmi et al. | |
| 2017/0201823 | A1 * | 7/2017 | Shetye | H04R 1/26 |
| 2019/0215595 | A1 * | 7/2019 | Beaudoin | H04R 1/1058 |
| 2022/0139366 | A1 | 5/2022 | Asada et al. | |
| 2022/0345808 | A1 | 10/2022 | Keady | |
| 2024/0080604 | A1 * | 3/2024 | Hua | H04R 1/1083 |

* cited by examiner

EAR TIP CONNECTED TO EAR BUD BODY INNER PORTION CONFIGURED TO PROVIDE ACOUSTIC IMPEDANCE THROUGH TIP VENT

CROSS REFERENCE TO RELATED APPLICATIONS

The present application claims priority to Australian Patent Application No. 2022903217, filed Oct. 29, 2022 and Australian Patent Application No. 2023900003, filed Jan. 3, 2023, both of which applications are hereby incorporated herein by reference in entirety.

FIELD

The present disclosure relates to an audio reproducing ear bud and an ear tip for use with an audio reproducing ear bud.

BACKGROUND

The quality of audio produced by audio reproducing devices is complex and dependent on a number of factors. For example, in relation to audio reproducing hearing devices of ear bud type, it is desirable to provide a device that delivers high quality music sound fidelity to a user, whilst providing noise cancellation and personalised hearing assistance functionality in a small compact package that can fit within the concha of the ear.

However, it is difficult to provide a hearing device that simultaneously provides adequate hearing assistance, noise cancellation and music reproduction without significant occlusion.

Typically, an ear bud includes an ear tip formed of flexible material that facilitates sealed coupling of the ear bud with a user's ear canal during use, so that the characteristics of the sound heard by the user can be well controlled and optimised and background noise attenuated from reaching the user's ear canal.

Conventional ear tips also typically include one or more wax barriers that prevent or minimise egress of ear wax from the user's ear canal into the ear bud.

However, a consequence of providing a sealed coupling between the ear tip and the user's ear canal is that the user can experience the 'occlusion effect' which causes the user's voice to sound hollow or boomy. The occlusion effect occurs because sound associated with the user's voice is conducted to the user's ear canal through the cartilaginous canal wall when the user speaks and becomes trapped in the ear canal.

The occlusion effect can be alleviated by providing a vent in an ear bud body and an audio channel that during use defines an audio path between the vent and the user's ear canal.

The occlusion effect can also be alleviated by using an open ear tip design wherein a sealed coupling is not provided between the ear bud and the user's ear canal during use, and instead vents are provided in the dome of the flexible ear tip material to allow sound in the ear canal to escape. The open ear tip design also allows ambient sound to reach the user's ear canal, where it would ordinarily be blocked by a sealed coupling.

However, while satisfactory for hearing assistance purposes, with the conventional ear bud body or ear tip vented arrangements, an impractically large ear bud speaker is required for music reproduction in order to provide a good low frequency response for the user and satisfactory reduction of occlusion.

In addition, with the vented ear tip arrangement, it becomes more difficult to manage the acoustic reproduction characteristics of the ear bud because the vents in the flexible ear tip in the conventional design are in contact with the ear canal walls, which renders the use of controlled acoustic impedance meshes over the vents unreliable.

In addition, a consequence of providing vents in the ear bud body or ear tip is that ingress of outside noise into the ear canal is increased. While an active noise cancellation (ANC) arrangement can be used to reduce ambient noise in the user's ear canal, an unrealistically large speaker would be required to reproduce an adequate frequency range for satisfactory noise cancellation to occur in an ear bud design.

SUMMARY

In accordance with a first aspect of the present invention, there is provided an ear tip for connection to an ear bud body of an ear bud, the ear tip comprising: an inner part connectable to the ear bud body, and an outer part disposed at least partially over the inner part, the outer part at least partially formed of flexible material and configured to couple the ear tip to a user's ear canal during use; wherein the inner part includes an inwardly facing wall surface and an outwardly facing wall surface, the inwardly facing wall surface defining at least part of a primary sound communication path during use between the user's ear canal and the ear bud body, and the inner part includes at least one tip vent disposed in the inner part that defines an ambient sound communication path during use between the inwardly facing wall surface and the outwardly facing wall surface and thereby the user's ear canal and ambient; the inner part configured to provide an acoustic impedance to sound passing through the at least one tip vent and thereby defined sound characteristics in the ambient audio communication path.

In an embodiment, the inner part includes an acoustic filter disposed over each at least one tip vent, the acoustic filter configured to provide defined sound characteristics in the ambient audio communication path.

In an embodiment, at least one acoustic filter is disposed on an outwardly facing portion of a tip vent.

In an embodiment, the acoustic filter has an acoustic impedance between about 1 to about 1000 MKS Rayls.

In an embodiment, the acoustic filter is formed of polyethylene terephthalate (PET) material.

In an embodiment, the acoustic filter is an acoustic mesh.

In an embodiment, each tip vent has a cross sectional area of about 0.5 mm2 to 10 mm2, preferably about 3.5 mm2.

In an embodiment, each tip vent has a depth between about 0.5 mm and about 1 mm.

In an embodiment, the inner part is configured to provide defined sound characteristics in the ambient audio communication path by forming a plurality of tip vents of selected size in the inner part.

In an embodiment, the ear tip comprises a barrier member disposed in the inner part adjacent the at least one tip vent, the barrier member preventing ear wax in a user's ear canal from reaching the at least one tip vent and the ear bud during use.

In an embodiment, the barrier member is formed of open cell foam material.

In an embodiment, the barrier member is separately formed from the inner part, and the inner part may include at least one projection arranged to retain the barrier member relative to the inner part. Alternatively, the barrier member is integrally formed with the inner part.

The barrier material may be substantially acoustically transparent.

In an embodiment, the inner and outer parts are integrally formed. Alternatively, the inner and outer parts are defined by first and second separate parts connected together.

In an embodiment wherein the first and second parts are separate and connected together, the second part may be overmolded onto the first part. With this arrangement, the first part may include a connection device, such as at least one ridge, to facilitate secure connection of the second part to the first part when the second part is overmolded onto the first part.

In an embodiment, each at least one tip vent is substantially oval shaped.

In an embodiment, the ear tip comprises 2 tip vents disposed at diametrically opposite locations.

In accordance with a second aspect of the present invention, there is provided an ear bud including an ear tip according to the first aspect of the present invention.

In accordance with a third aspect of the present invention, there is provided an ear bud for reproducing audio, the ear bud comprising: an ear bud body; a speaker disposed in the ear bud body and arranged to produce sound in response to an input speaker signal, the ear bud arranged to direct sound from the speaker along a sound communication path to a user's ear canal during use; at least one internal microphone disposed such that the at least one internal microphone is in audio communication with the user's ear canal during use but not located in the sound communication path; and a noise cancelling component arranged, during use, to substantially cancel defined sounds in the user's ear canal using the at least one internal microphone.

In an embodiment, the microphone sound port is elongate, wherein the at least one internal microphone is disposed adjacent a first longitudinal end of the microphone sound port relatively remote from the user's ear canal during use, and an opposite second longitudinal end of the microphone sound port is disposed relatively adjacent and in audio communication with the user's ear canal during use. The microphone sound port length may be between about 2 mm to about 5 mm.

In an embodiment, the microphone sound port includes a microphone sound port aperture disposed at the second longitudinal end of the microphone sound port.

In an embodiment, the ear bud includes a microphone sound port acoustic filter arranged to provide a defined sound impedance for sound passing through the microphone sound port aperture.

In an embodiment, the microphone sound port acoustic filter comprises a mesh with a defined acoustic impedance. The acoustic impedance may be between about 20 and about 100 MKS Rayls.

In an embodiment, the speaker is disposed in a speaker chamber such that sound produced by the speaker in response to an input speaker signal travels from the speaker through the speaker chamber to a user's ear canal during use.

In an embodiment, the speaker chamber is defined by a chamber portion and a speaker sound port, the speaker sound port including a speaker sound port aperture at an end of the speaker sound port remote from the chamber portion.

In an embodiment, the ear bud includes a speaker sound port acoustic filter arranged to provide defined sound impedance for sound passing through the speaker sound port aperture.

In an embodiment, the speaker sound port acoustic filter comprises a mesh with a defined acoustic impedance. The acoustic impedance may be between about 20 and about 100 MKS Rayls.

In an embodiment, the microphone sound port aperture and the speaker sound port aperture are disposed at an interface portion on the ear bud body, wherein the interface portion is for connection to an ear tip. A single acoustic filter may be disposed over both of the microphone sound port aperture and the speaker sound port aperture.

Also disclosed is an ear bud for reproducing audio, the ear bud comprising: an ear bud body; a speaker disposed in a speaker chamber such that sound produced by the speaker in response to an input speaker signal travels from the speaker through the speaker chamber to a user's ear canal during use; a body chamber disposed adjacent the speaker chamber and isolated from sound in the speaker chamber such that no unobstructed sound path exists from the speaker chamber to the body chamber; and at least one body vent disposed on the ear bud body such that an audio path is defined for audio to pass from the body chamber to ambient.

In an embodiment, each at least one body vent includes a body vent acoustic filter configured to provide defined impedance characteristics for sound passing through the body vent.

In an embodiment, the body vent acoustic filter has an acoustic impedance between about 10 to about 200 MKS Rayls.

In an embodiment, at least one body vent corresponds to an aperture area between about 2 mm2 and about 10 mm2.

In accordance with a fourth aspect of the present invention, there is provided a pair of ear buds, each ear bud according to the second, third or fourth aspect of the present invention, and the pair of ear buds including a right ear bud arranged to be worn in a user's right ear and a left ear bud arranged to be worn in a user's left ear.

BRIEF DESCRIPTION OF THE DRAWINGS

The present invention will now be described by way of example only with reference to the accompanying drawings, in which.

DETAILED DESCRIPTION OF THE DRAWINGS

Figure 1:
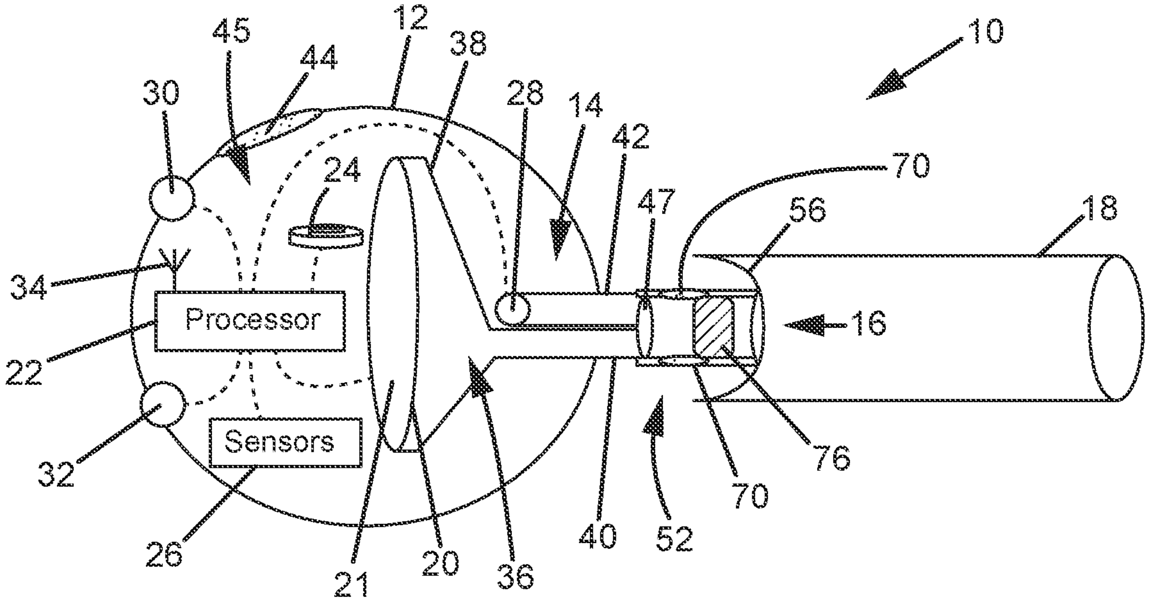
FIG. 1 is a diagrammatic perspective view of an ear bud audio reproducing device in accordance with an embodiment of the present invention.

Referring to the drawings, FIG. 1 shows an audio reproducing ear bud 10 that includes an ear bud body 12 and a sound conduit portion 14 extending from the body portion 12 and connecting to an ear tip 16. During use, the ear bud 10 is worn by a person by disposing the ear tip 16 in the person's ear canal 18.

It will be understood that while only one ear bud 10 is shown in FIG. 1, typically a pair of ear buds 10 would be used, including a first ear bud configured for use with a left ear and a second ear bud configured for use with a right ear.

Each ear bud 10 includes a speaker 20, in this example a dynamic speaker with a 12 mm diameter diaphragm 21. In the present example, the speaker is capable of producing a frequency response of about 20 Hz to about 20,000 Hz, and a sound pressure level (SPL) of about 120 dB at 100 Hz.

Each ear bud 10 also includes a processor 22 arranged to implement and control functionality of the ear bud. In this example, the processor 22 is arranged to: implement general functionality of the ear bud; implement wireless functionality using an antenna 34, for example so that the ear bud 10 is able to wirelessly communicate with an associated computing device such as a smartphone, receive control commands from the computing device, and transmit signal to and receive audio from the computing device, for example using Bluetooth protocols; implement hearing assistance processing and amplification functionality so that a user is provided with hearing assistance, for example ambient sound amplification according to a user-specific hearing profile; and/or implement active noise cancellation (ANC) functionality that for example substantially cancels ambient sound detected by one or more external or internal microphones and present in the ear canal 18 and/or substantially cancels occlusion sounds present in the ear canal 18.

The processor 22 also may also be arranged to operate in association with an external computing device, such as a user's smartphone, to perform a hearing assessment on the user, and subsequently configure the hearing assistance functionality of the ear bud 10 according to the hearing characteristics of the user, for example based on the hearing assessment carried out using the ear bud 10 and an associated hearing assessment application implemented on the user's smartphone.

In an example, the hearing assessment is based on assessment of hearing capabilities of a user in frequency bands 500 Hz, 1000 Hz, 3000 Hz, and 4000 Hz, although it will be understood that any suitable frequency bands may be used.

Typically, a wide dynamic range control (WDRC) hearing amplification regime is used to amplify sounds.

In the present example, the processor 22 has a latency of at most about 1 ms to about 5 ms when amplifying sound for hearing assistance.

In the present example, an active noise cancellation (ANC) component of the processor 22 has a latency of at most about 20 μs when processing microphone sound signals from internal and external microphones 28, 30, 32, filtering the microphone sound signals and outputting a speaker sound signal to the speaker 20.

The ANC component may be configured to substantially cancel ambient sound in a range of about 20 Hz to about 1000 kHz at a peak level of at least 20 dB.

The ANC component may implement a hybrid ANC scheme that uses at least 1 feedforward microphone and at least one feedback microphone.

In the present example, the processor 22 implements a feedback cancellation scheme that reduces the prevalence of feedback to the user when acting as a hearing amplification assistance device.

Each ear bud 10 also includes a power source 24, in this example in the form of rechargeable battery, and sensors 26, for example arranged to detect when the ear bud 10 is disposed in a user's ear canal 18 and to detect when the ear bud 10 is disposed in a charging case (not shown).

Signals from the sensors 26 may for example be used to dispose the ear bud 10 in a low power state in response to a determination that the ear bud 10 is not disposed in an ear of a user. The low power state may be such that the ear bud 10 amplification and/or ANC functions of the ear bud are disabled and the ear bud consumes at most about 500 μA.

The sensors 26 may include an infra-red sensor arranged to sense when the ear bud 10 is disposed in an ear canal 18 of a user.

In an example, the ear bud 10 is arranged to enable amplification functionality after the sensors 26 have determined that the ear bud 10 is disposed in an ear canal 18 of a user, and the user has removed his/her hand from the ear bud 10. In this way, undesirable feedback associated with contact between the user's hand and the ear bud 10 is avoided.

The ear bud 10 also includes an internal microphone 28 that produces an internal microphone signal indicative of sound present in a space between the internal microphone 28 and the user's ear canal 18. The internal microphone signal is used by the processor 22 to substantially cancel ambient and occlusion sounds present in the ear canal 18.

The ear bud 10 also includes first and second external microphones 30, 32 that produce respective first and second external microphone signals indicative of ambient sound present adjacent and external of the ear bud 10. The external microphone signals are used by the processor 22 to substantially cancel ambient sounds in the ear canal 18. The external microphones 30, 32 are also used to sense ambient sound for the hearing assistance functions.

In the present example, the internal and external microphones 28, 30, 32 have a signal to noise ratio (SNR) of at least about 65 dB at 94 dB sound pressure level (SPL) input, and an acoustical overload point of at least about 120 dB SPL.

Figure 2:
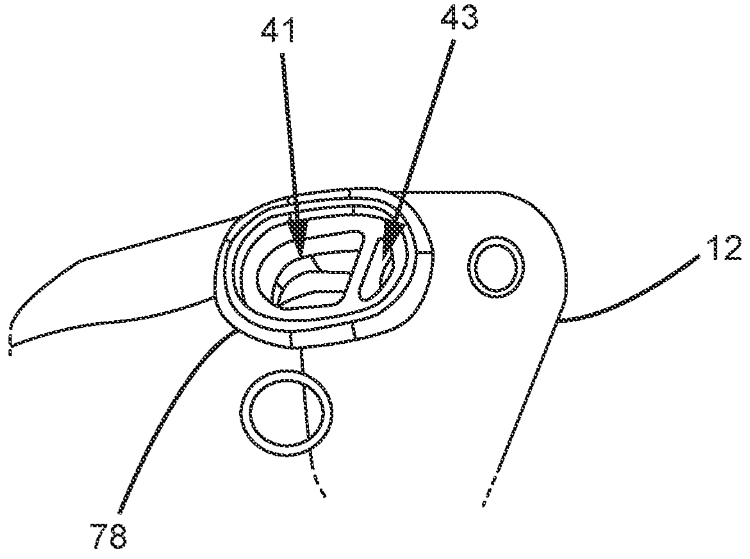
FIG. 2 is a diagrammatic representation of speaker and internal microphone apertures of the ear bud shown in FIG. 1.
Figure 3:
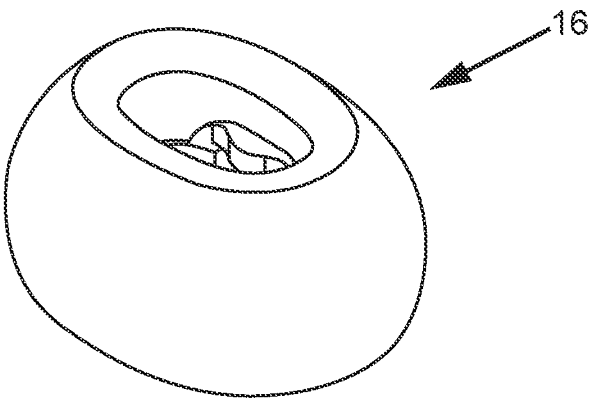
FIG. 3 is a diagrammatic perspective view of an ear tip in accordance with an embodiment of the present invention.
Figure 4:
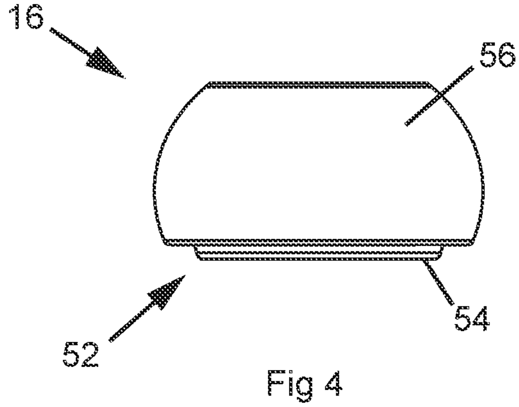
FIG. 4 is a diagrammatic side view of the ear tip shown in FIG. 3.
Figure 5:
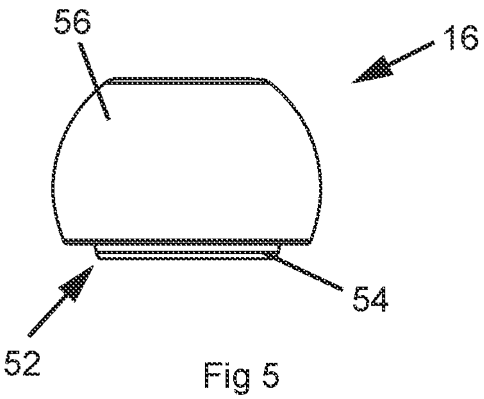
FIG. 5 is a diagrammatic end view of the ear tip shown in FIGS. 3 and 4.

The speaker 20 is mounted such that a diaphragm of the speaker 20 faces a speaker chamber 36 defined by a chamber portion 38 and a speaker sound port 40, the speaker chamber 36 directing sound from the speaker 20 to the user's ear canal 18 through a speaker sound port aperture 41, shown more particularly in FIG. 2. The speaker 20 is sealed relative to the speaker chamber 36 such that the speaker chamber 36 is isolated from a body chamber 45, in particular at a location behind the speaker 20. In this way, the speaker chamber 36 provides a consistent and controlled volume for the speaker 20.

In this example, the speaker sound port 40 is of generally elongate configuration, such as an elongate cylindrical shape.

In the present example, the speaker chamber 36 is formed separately of the ear bud body 12 and fixed inside the ear bud body 12 in any suitable way, although it will be understood that alternatives are possible. For example, the speaker chamber 36 may be formed integrally with the ear bud body 12.

The speaker chamber 36 is also in sound communication with vents formed in the ear tip 52 and over which are disposed acoustic filters 70, as discussed in more detail below in relation to FIGS. 3 to 12.

The internal microphone 28 is disposed in an internal microphone sound port 42 in audio communication with the user's ear canal 18 during use, with the internal microphone 28 disposed such that the internal microphone 28 is located relatively adjacent the user's ear canal 18, spaced from the speaker chamber and not in a direct sound communication path between the speaker 20 and the user's ear canal 18.

In this way, an internal microphone path at least partly defined by the internal microphone sound port 42 is separate to the speaker sound communication path that is at least partly defined by the speaker sound port 40.

As a consequence of disposing the internal microphone 28 away from the speaker sound communication path, the sound pressure level (SPL) at the internal microphone 28 is reduced relative to the SPL at the speaker 20, which results in less active noise cancellation (ANC) artifacts and avoids overloading the internal microphone 28.

In this example, the microphone sound port 42 is of generally elongate configuration, such as an elongate cylindrical shape.

The internal microphone sound port 42 has a microphone sound port aperture 43, shown more particularly in FIG. 2, disposed at an end of the internal microphone sound port 42 opposite to the internal microphone 28. In the present example, the speaker sound port aperture 41 and the microphone sound port aperture 43 are both disposed at an interface location between the ear bud body 12 and the ear tip 16 during use, as shown in FIG. 2. In this example, the speaker sound port aperture 41 is larger than the internal microphone sound port aperture 43.

In the present example, acoustic filtering properties are provided to the internal microphone port 42 and the speaker port 40 by disposing an acoustic filter 47 over the speaker sound port aperture 41 and the internal microphone sound aperture 43. The acoustic filter 47 may comprise a mesh with an impedance of between about 20 and about 100 MKS Rayls. In an alternative, instead of a single acoustic filter 47 covering both the speaker sound port aperture 41 and the internal microphone sound port aperture 43, separate acoustic filters (not shown) may be provided that have the same or different impedance characteristics.

The speaker diaphragm 21 is in communication with the body chamber 45, for example by providing an aperture (not shown) at a rear portion of the speaker chamber 36. The ear bud 10 also includes a body vent 44 disposed in the ear bud body 12 that interacts with the speaker diaphragm 21 and allows the rear of the speaker diaphragm 21 to vent to ambient. By adjusting the properties of the body vent 44, such as the dimensions and acoustic filtering properties of the body vent 44, it is possible to tune the frequency response of the speaker 20. In this example, the properties of the body vent 44 are defined by selecting the shape and size of the body vent 44 and selecting a mesh with appropriate acoustic impedance properties. By selecting appropriate acoustic impedance properties, low frequency sounds that the user hears during use can be enhanced.

Since the body chamber 45 is isolated from the speaker chamber 36, the body vent 44 is isolated from the speaker chamber 36 and no unobstructed sound path exists between the body vent 44 and the user's ear canal 18 during use, the only sound path from ambient to the ear canal 18 during use is through the acoustic filters 70 provided on the ear tips 16.

In the present example, the size of the body vent 44 is between about 2 mm2 and 10 mm2, and the body vent mesh 47 has a characteristic impedance of between about 10 and 200 MK Rayls.

In the present example, the ear bud 10 also includes a user interface (not shown) that may include a button that may be of tactile or capacitive type.

FIGS. 3 to 12 show an ear tip 16 according to an embodiment of the invention, the ear tip 16 connectable to an ear bud body 10 that includes functional components of an ear bud. In this example, the ear tip 16 is of generally oval cross-sectional shape, although it will be understood that alternatives are possible, such as generally circular cross-sectional shape.

It will be understood that ear tips of ear buds are typically intended to be replaceable components, for example so that an ear tip suffering from reduced performance due to presence of ear wax can be replaced with a new ear tip, or so that a poorly fitting ear tip can be replaced with an ear tip that is a better shape match with the user's ear canal. In this way, the relatively inexpensive part of the ear bud that is expected to deteriorate during use is separated from the relatively expensive part of the ear bud, and the user typically need only replace the inexpensive ear tip rather than the expensive ear bud body.

The ear tip 16 includes an inner part 52 and an outer part 56. The inner part 52 is connectable to the ear bud body 12, shown in FIGS. 1 and 11, and the outer part 56 is disposed at least partially over the inner part 52, as shown more particularly in FIGS. 7, 8*a* and 8*b*. As shown in FIGS. 8*a* and 8*b*, the inner part 52 defines a primary sound communication path 57 during use between the ear bud body 12 and the user's ear canal.

In this example, the inner part 52 includes an inner wall 54 and a body portion 58 that are connected together, for example by overmolding the inner wall 54 on the body portion 58, although it will be understood that any suitable connection arrangement is envisaged. In this example, the outer part 56 defines an outer wall that is integral with the inner wall 54 and therefore the outer and inner walls 54, 56 are formed together by overmolding on the body portion 58.

Figure 10:
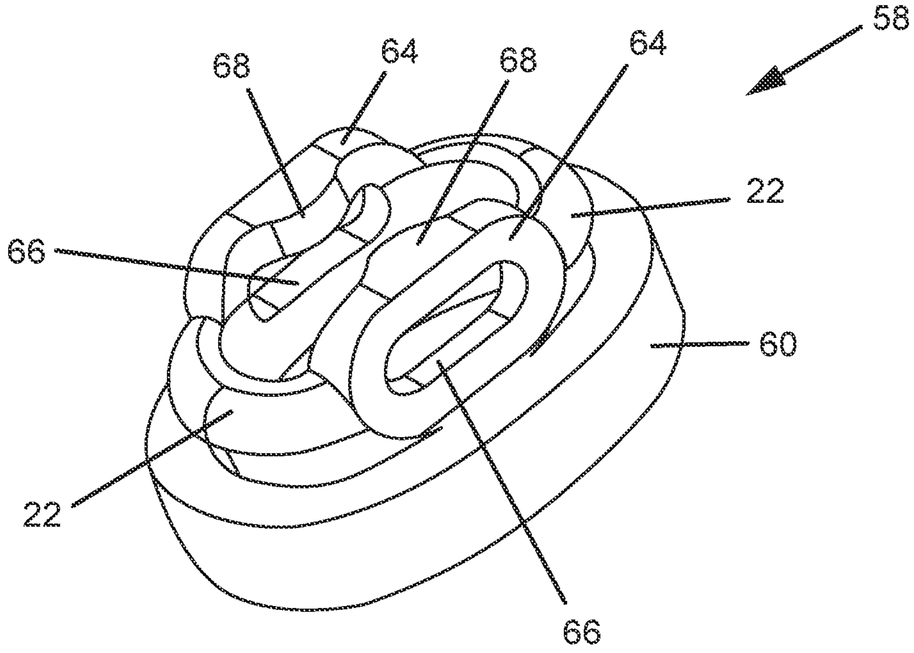
FIG. 10 is a diagrammatic perspective view of a body portion of the ear tip shown in FIGS. 3 to 9.
Figure 11:
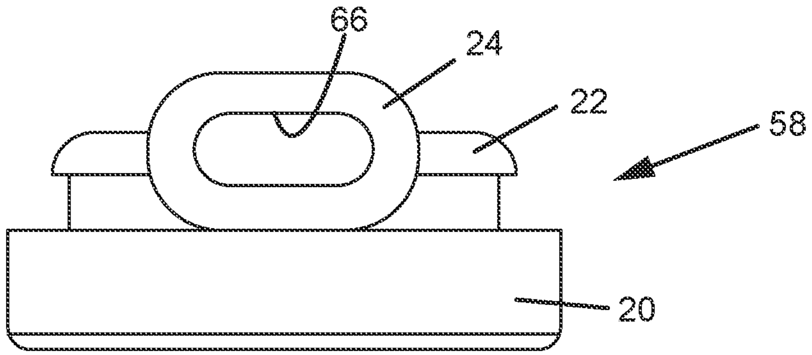
FIG. 11 is a diagrammatic side view of the body portion shown in FIG. 10.

As shown more particularly in FIGS. 10 and 11, the body portion 58 includes a base 60, a pair of ridge portions 62 extending from the base 60 and disposed at diametrically opposite locations, and a pair of vent frames 64 extending from the base 60 and disposed at diametrically opposite locations. Each vent frame 64 includes a vent in the form of an aperture 66, and each aperture 66 has an associated acoustic filter 70 fixed to the respective vent frame 64 in any suitable way, for example using adhesive or by inmold mesh over molding. The apertures 66 and associated acoustic filters 70 facilitate ambient sound paths 74 during use between the user's ear canal and ambient, as shown in FIG. 8, that serve to reduce or avoid the occlusion effect during use. The apertures 66 also serve to provide a path for moisture to pass from the user's ear canal to ambient.

Each acoustic filter 70 is configured to provide a defined acoustic impedance to sound passing through the aperture 66 and thereby selected audio characteristics in the ambient sound path 74 in terms of sound attenuation characteristics and response to relatively low frequencies. In the present example, each acoustic filter 70 has an associated acoustic mesh 72 that spans the respective aperture 66.

Preferably, the surface area of each aperture is about 0.5 mm2 to 10 mm2. In the present example, the surface area of each aperture 66 is about 3.5 mm2.

In addition, since the thickness of the part of the inner wall 64 that defines the aperture 66 can also affect the characteristics of the sound that passes through the aperture 66, the thickness of the inner wall 64 at the aperture 66 is selected accordingly. In the present example, the thickness of the inner wall 64 at the aperture is between about 0.5 mm and about 1 mm.

The acoustic mesh 62 is chosen to provide defined acoustic impedance properties, and in the present example the acoustic mesh 62 has an acoustic impedance between about 1 to 1000 MKS Rayls. The acoustic Mesh 62 may be formed of any suitable material, such as polyethylene terephthalate (PET) material, or any other material with a controlled pore size that results in controlled acoustic impedance characteristics.

It will be understood that the acoustic impedance of the acoustic mesh 62 may be adjusted to control the characteristics of the sound that passes through an aperture 66.

It is also envisaged that in addition or alternatively, a defined acoustic impedance may be achieved by integrally forming apertures of defined size in the inner wall 64, for example using laser drilling.

FIG. 8*b* shows a cross-sectional view of the ear tip 16 shown in FIG. 8 with features removed so as to more clearly show an outwardly facing wall surface 53 and an inwardly facing wall surface 55 of the inner part 52. As shown, the inwardly facing wall surface 55 defines the primary sound communication path 57 during use between the user's ear canal and the ear bud body 12, and the apertures 66 disposed in the inner part 52 define an ambient sound communication path during use between the inwardly facing wall surface 55 and the outwardly facing wall surface 53 and thereby the user's ear canal and ambient.

It will be understood that since in this example the inner part 52 is defined by the inner wall 54 and the body portion 58 that are connected together, the inwardly facing wall surface 55 and the outwardly facing wall surface 53 are defined by the inner wall 54 and the body portion 58. However, it will be understood that alternative arrangements are possible. For example, instead of multiple components, the inner part 52 may comprise a single component that defines both the inwardly facing wall surface 55 and the outwardly facing wall surface 53.

It will be understood that since the ear tip 16 is configured in the following way, the likelihood of wax deposits occurring at the apertures 66 and acoustic filters 70 is low: the apertures 66 and acoustic filters 70 are disposed on the inner part 52 of the ear tip 50 and not the outer part 56; the outwardly facing wall surface 53 of the inner part 52 is covered by the outer part 66 at the apertures 66; the apertures 66 extend through the inner part 52 from the outwardly facing wall surface 53 to the inwardly facing wall surface 55; and the outer part 56, but not the outwardly facing wall surface 53 or the inwardly facing wall surface 55 of the inner part 52 at the apertures 66, contacts the ear canal during use.

It will also be understood that since the vents are disposed in the ear tip 16 at a location adjacent the user's ear canal 18, sound that leaves and enters the ear canal 18 through the ear tip 16 does so very close to the natural opening of the ear canal 18. This is in contrast to a conventional arrangement wherein sound enters and leaves the ear canal 18 through the ear bud body, which creates a longer, more convoluted sound path.

In the present example, the ridge portions 62 facilitate secure connection of the inner wall 64 to the body portion 68 when the inner wall 64 is overmolded onto the body portion 68.

Figure 12:
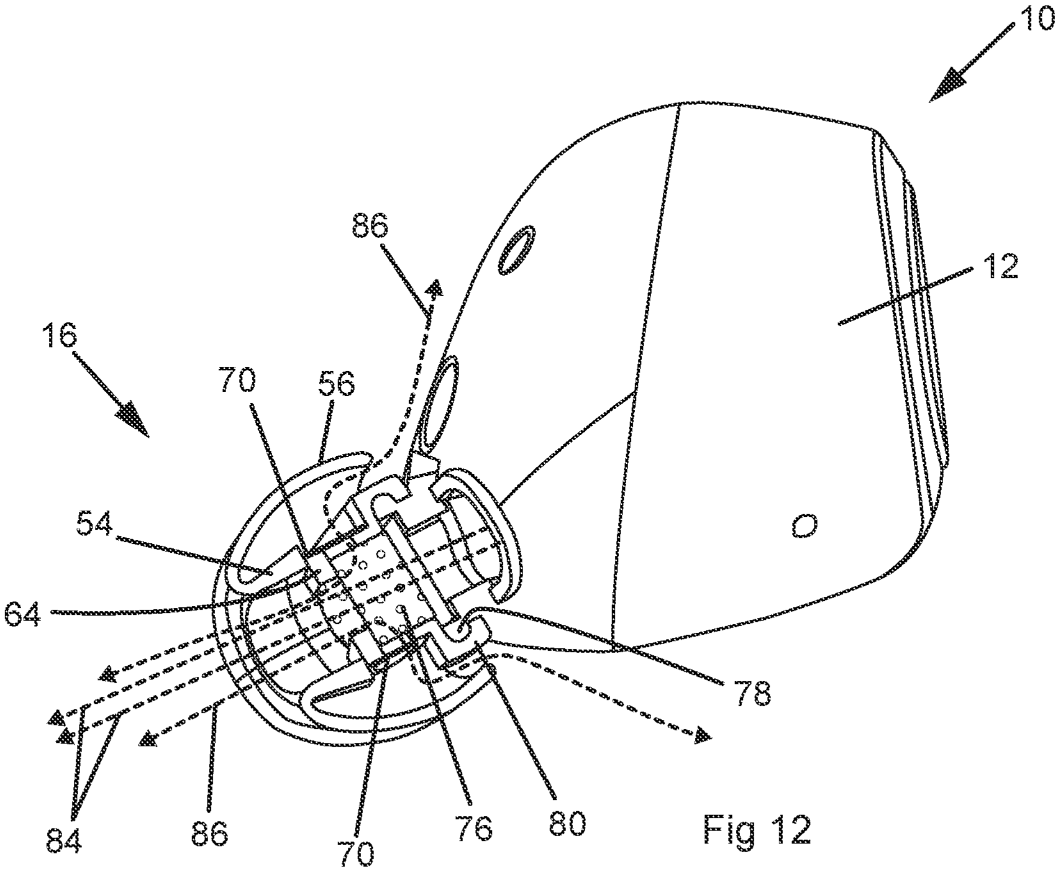
FIG. 12 is a diagrammatic cut-away view of the ear tip shown in FIGS. 3 to 11, with the ear tip connected during use to an ear bud body.

The body portion 68 also includes an attachment structure 78 arranged for enable the ear tip 50 to connect to a tip connector 80 of an ear bud body 12, as shown in FIG. 12.

However, while the present embodiment is described in relation to an inner part 52 that is formed of 2 connected components (the body portion 58 and the inner wall 54), it will be understood that in an alternative arrangement the inner part 52 may be formed of one component, and for example the component integrally formed with the outer wall 56.

The outer part 56 is at least partially formed of flexible material and has a defined shape such that the outer part 56 fits into an opening of a user's ear canal during use and at least partially conforms to the shape of the ear canal opening to form a seal with the ear canal opening.

In the present example, the inner and outer walls 54, 56 are formed of silicone material, such as Shore A Hardness 70 silicone material, and the body portion 58 is formed of silicone material of higher hardness than the inner and outer walls 54, 56, such as Shore A hardness 70 silicone material. However, it will be understood that other arrangements are possible. For example, the inner and outer walls 54, 56 and the body portion 58 may be formed of the same type of silicone material, and the inner and outer walls 54, 56 and body portion 58 may be integrally formed instead of separately formed.

Figure 9:
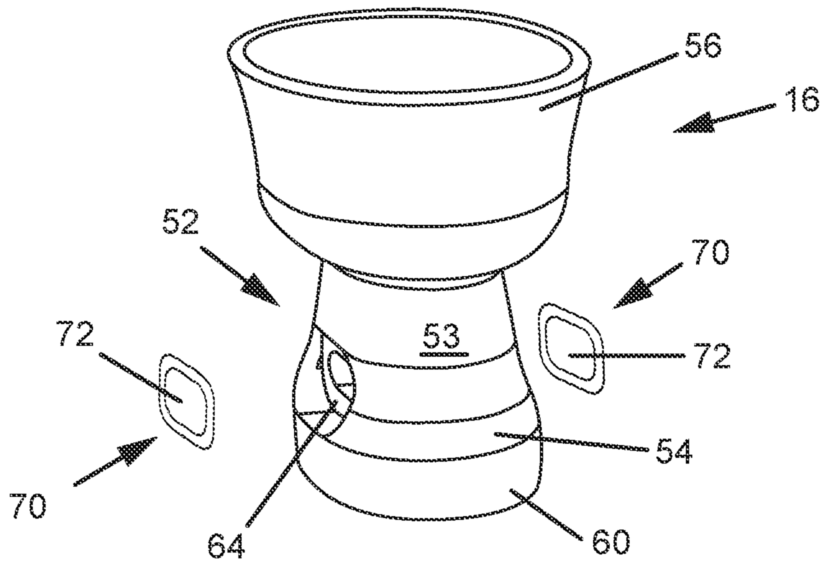
FIG. 9 is a diagrammatic perspective view of the ear tip shown in FIGS. 3 to 8*b*, with an outer part of a tip portion of the ear tip shown in a folded over position.

FIG. 9 shows the ear tip 50 with the outer part 56 folded away from the inner part 52 so that the inner part 52 and outer part 56 of the ear tip 50 are more clearly shown.

Figure 6:
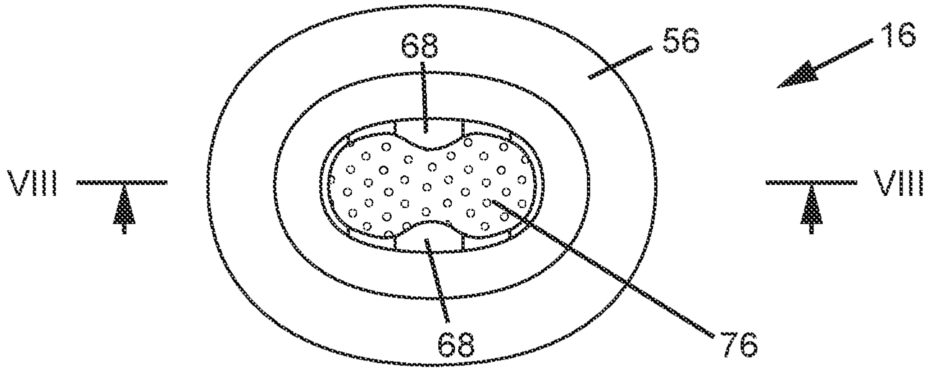
FIG. 6 is a diagrammatic top view of the ear tip shown in FIGS. 3 to 5.
Figure 7:
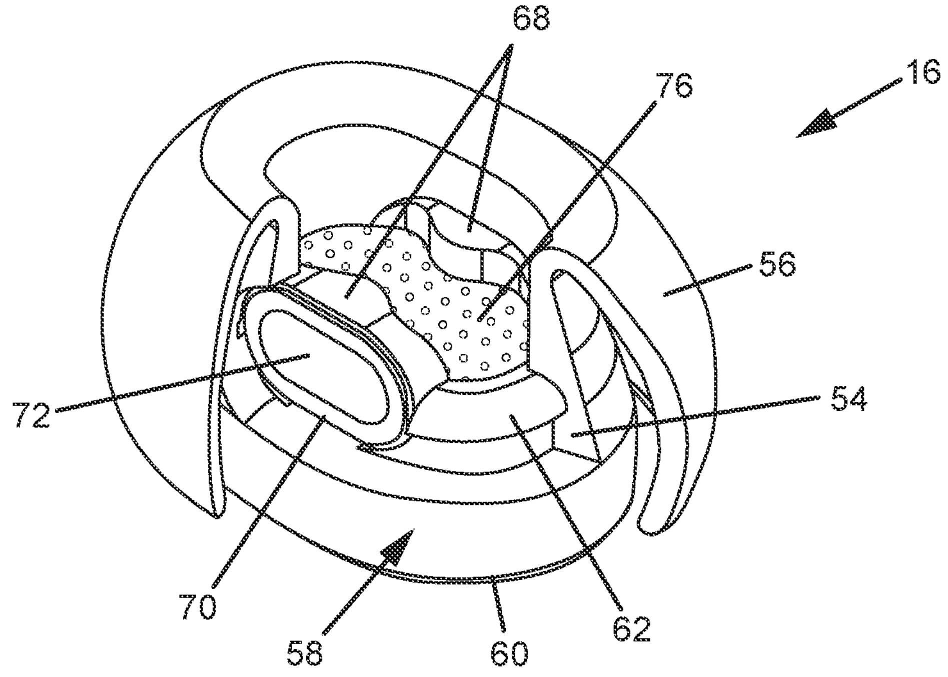
FIG. 7 is a diagrammatic partly cut away perspective view of the ear tip shown in FIGS. 3 to 6.
Figure 8A:
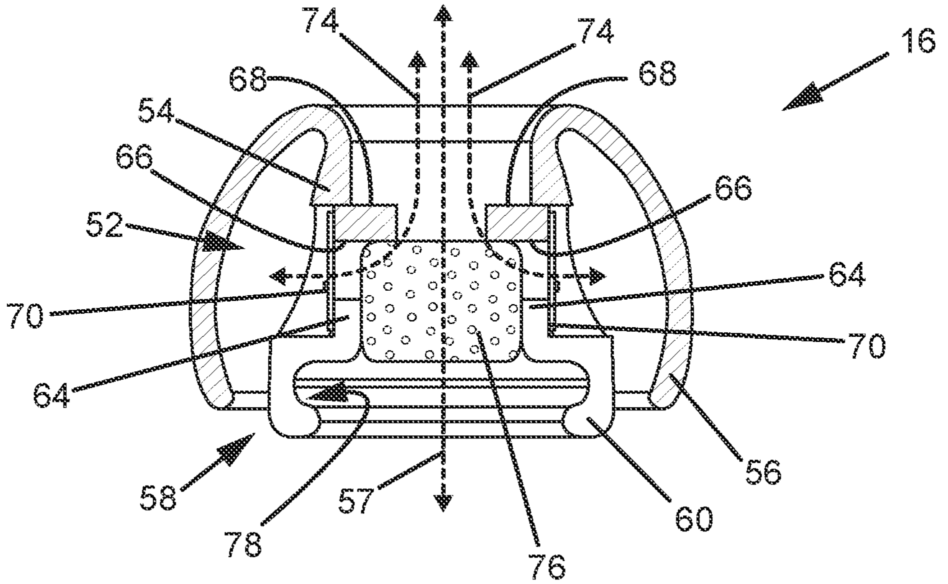
FIG. 8*a* is a diagrammatic cross-sectional view of the ear tip shown in FIGS. 3 to 7 taken along the line VIII-VIII in FIG. 6 in the direction of the arrows.
Figure 8B:
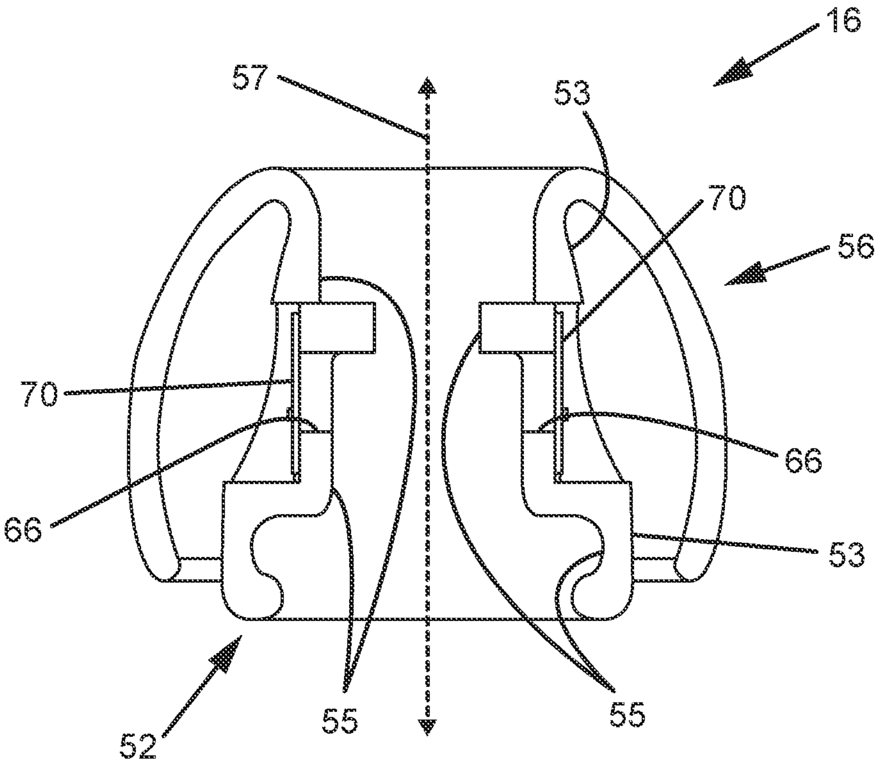
FIG. 8*b* is a diagrammatic cross-sectional view of the ear tip shown in FIG. 8 with features removed so as to more clearly show inwardly facing and outwardly facing walls defined by an inner portion of the ear tip.

As shown more particularly in FIGS. 6 to 8, in the present example the ear tip 50 also includes a barrier member 76 disposed during use in the sound communication path 57 and the ambient communication paths 74 so that any ear wax present in the user's ear canal cannot pass to the ear bud body 12 or to the acoustic filters 70. During use, the barrier member 76 is disposed in the ambient communication path 74 between the user's ear canal and the apertures 66. In this way, the functional components of the ear bud are protected from ear wax, and ear wax is prevented from reaching the apertures 66 and acoustic filters 70, thereby preserving the predefined acoustic characteristics of the selected acoustic filters 70.

In the present example, the barrier member 76 is formed of relatively acoustically transparent material, such as open cell foam material that may be a reticulated polyurethane foam with a controlled pore size between about 20 ppi and 80 ppi, most preferably between about 40 ppi and 60 ppi.

It will also be understood that a barrier material may be selected that has desired wax blocking and acoustic characteristics. The barrier member 76 could be selected to have a specific acoustic impedance to provide tuned acoustic characteristics.

In an alternative arrangement, the barrier member 76 may be integrally formed with the inner part 52 of the ear tip 50.

In the present example, the barrier member 76 is resilient and is held captive in the ear tip 50 by protrusions 58, although it will be understood that any suitable arrangement may be provided. For example, the barrier member 76 may be fixed in a desired position using adhesive.

In an alternate arrangement, the barrier member 76 is integrally formed with the inner part 52.

FIG. 12 shows the ear tip 50 connected to the ear bud body 12, in this example by engaging the attachment structure 78 of the ear tip 50 with a corresponding tip connector 80 of the ear bud body 12

As indicated by arrows 84, sound generated by the ear bud body 12 during use passes from the ear bud body 12 to a user's ear canal (not shown), and sound in the ear canal is allowed to pass to ambient through the acoustic filters 70, as indicated by arrows 86. Sound is also able to pass into the ear bud body 12 from the ear canal and ambient so that it may be used by the ear bud body 12 for sound processing purposes, for example for implementation of noise cancellation processing.

It will be understood that the present ear tip 50 is configured to enable sound in a user's ear canal to escape to ambient, thereby reducing the users experience of occlusion, while delivering a good music experience with a driver of suitable size for inclusion in a wearable ear bud device.

It is to be understood that, if any prior art publication is referred to herein, such reference does not constitute an admission that the publication forms a part of the common general knowledge in the art, in Australia or any other country.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments.

Modifications and variations as would be apparent to a skilled addressee are deemed to be within the scope of the present invention.

We claim:

1. An ear tip for connection to an ear bud body of an ear bud, the ear tip comprising:

an inner part connectable to the ear bud body, and an outer part disposed at least partially over the inner part, the outer part at least partially formed of flexible material and configured to couple the ear tip to a user's ear canal during use;

wherein the outer part and the inner part define a gap that is open at a free end of the outer part, and the ear tip is configured such that the inner part connects to the ear bud body at an end of the ear tip adjacent the free end of the outer part;

wherein the inner part includes an inwardly facing wall surface and an outwardly facing wall surface, the inwardly facing wall surface defining at least part of a primary sound communication path during use between the user's ear canal and the ear bud body, and the inner part includes at least one tip vent disposed in the inner part;

wherein each tip vent of the at least one tip vent has a tip vent ambient sound communication path during use that extends from the user's ear canal to the inwardly facing wall surface, through the at least one tip vent to the outwardly facing wall surface, and to ambient through the gap between the outer part and the inner part; and wherein during use sound from the ear canal to ambient travels only along the tip vent ambient sound communication path that passes through the at least one tip vent, wherein each of the at least one tip vent is configured to provide an acoustic impedance to sound passing therethrough and thereby defined sound characteristics in the tip vent ambient audio communication path.

2. The ear tip as claimed in claim 1, wherein the inner part includes an acoustic filter disposed over each tip vent of the at least one tip vent, each acoustic filter disposed over each tip vent of the at least one tip vent configured to provide defined sound characteristics in the tip vent ambient audio communication path passing through the at least one tip vent.

3. The ear tip as claimed in claim 2, wherein each acoustic filter has an acoustic impedance between 1 to 1000 MKS Rayls.

4. The ear tip as claimed in claim 1, wherein the inner part is configured to provide defined sound characteristics in the tip vent ambient audio communication path by forming a plurality of tip vents of selected size in the inner part.

5. The ear tip as claimed in claim 1, wherein each tip vent of the at least one tip vent has a cross sectional area of 0.5 $mm^2$ to 10 $mm^2$, and/or wherein each tip vent of the at least one tip vent has a depth between 0.5 mm and 1 mm.

6. The ear tip as claimed in claim 1, comprising a barrier member disposed in the inner part adjacent the at least one tip vent, the barrier member preventing ear wax in the user's ear canal from reaching the at least one tip vent and the ear bud body during use.

7. The ear tip as claimed in claim 6, wherein the barrier member is substantially acoustically transparent.

8. The ear tip as claimed in claim 6, wherein the barrier member is selected to provide a defined acoustic impedance.

9. The ear tip as claimed in claim 1, wherein the inner part and the outer part are defined by first and second separate parts connected together, the second part being overmolded onto the first part.

10. An ear bud including the ear tip as claimed in claim 1.

11. The ear bud as claimed in claim 10, comprising:

the ear bud body;

a speaker disposed in the ear bud body and arranged to produce sound in response to an input speaker signal, the ear bud arranged to direct sound from the speaker along the primary sound communication path to the user's ear canal during use;

at least one internal microphone disposed such that the at least one internal microphone is in audio communication with the user's ear canal during use but not located in the primary sound communication path; and a noise cancelling component arranged, during use, to substantially cancel defined sounds in the user's ear canal using the at least one internal microphone.

12. The ear bud as claimed in claim 11, wherein:

the internal microphone is disposed in sound communication with a microphone sound port;

the microphone sound port defines an internal microphone sound path; and the at least one internal microphone is disposed adjacent a first end of the internal microphone sound path relatively remote from the user's ear canal during use, and an opposite second end of the internal microphone sound path is disposed relatively adjacent and in audio communication with the user's ear canal during use.

13. The ear bud as claimed in claim 12, wherein the microphone sound port includes a microphone sound port aperture disposed at or adjacent the second end of the internal microphone sound path, and the ear bud includes a microphone sound port acoustic filter arranged to provide a defined sound impedance for sound passing through the microphone sound port aperture.

14. The ear bud as claimed in claim 13, wherein the acoustic impedance of the microphone sound port acoustic filter is between 20 and 100 MKS Rayls.

15. The ear bud as claimed in claim 11, wherein the speaker is disposed in a speaker chamber such that sound produced by the speaker in response to an input speaker signal travels from the speaker through the speaker chamber to the user's ear canal during use, the speaker chamber is defined by a chamber portion and a speaker sound port, and the speaker sound port includes a speaker sound port aperture at an end of the speaker sound port remote from the chamber portion.

16. The ear bud as claimed in claim 15, wherein the ear bud includes a speaker sound port acoustic filter arranged to provide defined acoustic impedance for sound passing through the speaker sound port aperture.

17. The ear bud as claimed in claim 16, wherein the acoustic impedance is between 20 and 100 MKS Rayls.

18. The ear bud as claimed in claim 15, comprising:

a body chamber disposed adjacent the speaker chamber and isolated from sound in the speaker chamber such that no unobstructed sound path exists from the speaker chamber to the body chamber; and at least one body vent disposed on the ear bud body such that an audio path is defined for audio to pass from the body chamber to ambient.

19. The ear bud as claimed in claim 18, wherein each of the at least one body vent includes a body vent acoustic filter configured to provide defined impedance characteristics for sound passing through the body vent between 10 to 200 MKS Rayls.

20. The ear bud as claimed in claim 18, wherein the at least one body vent corresponds to an aperture area between 2 $mm^2$ and 10 $mm^2$.

* * * * *